UNITED STATES PATENT OFFICE.

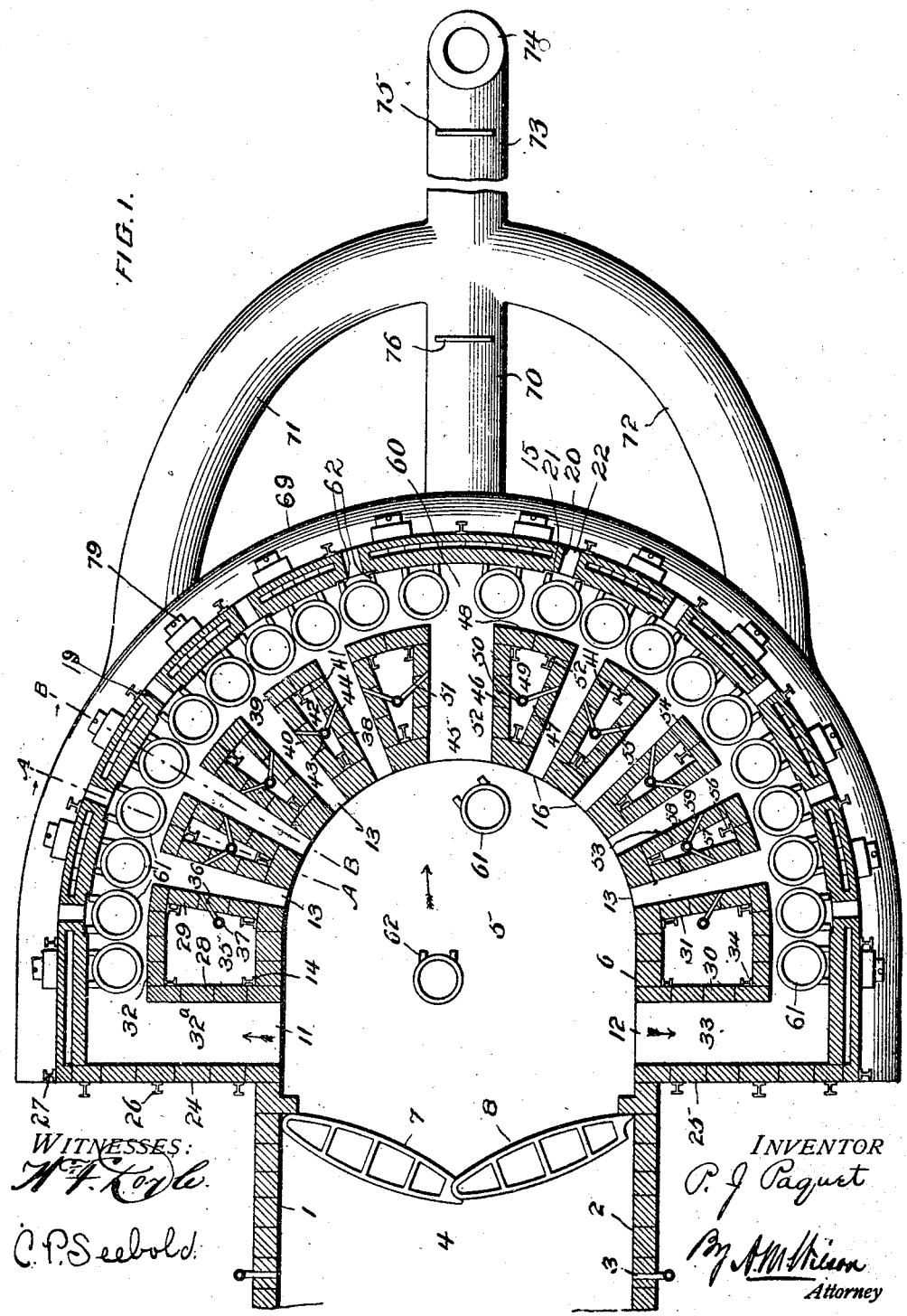

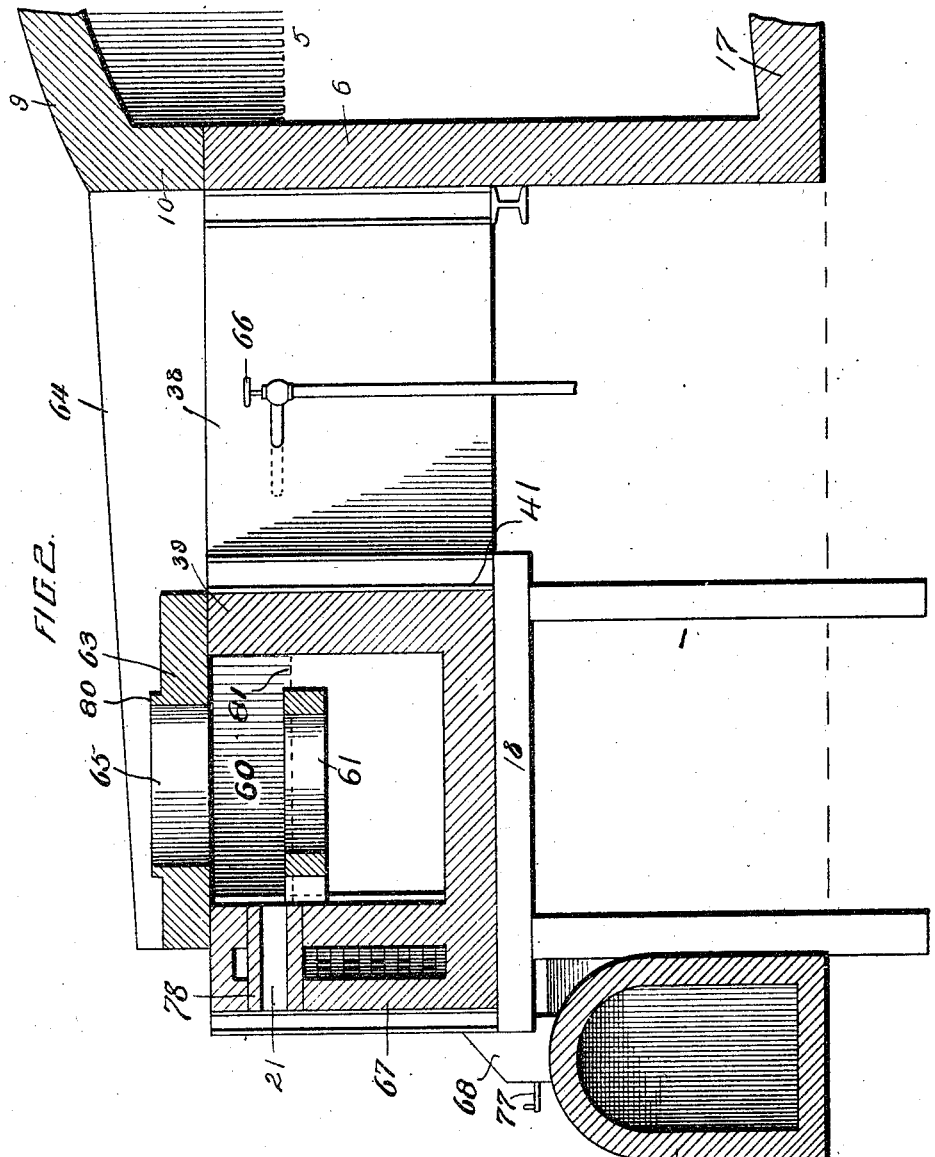

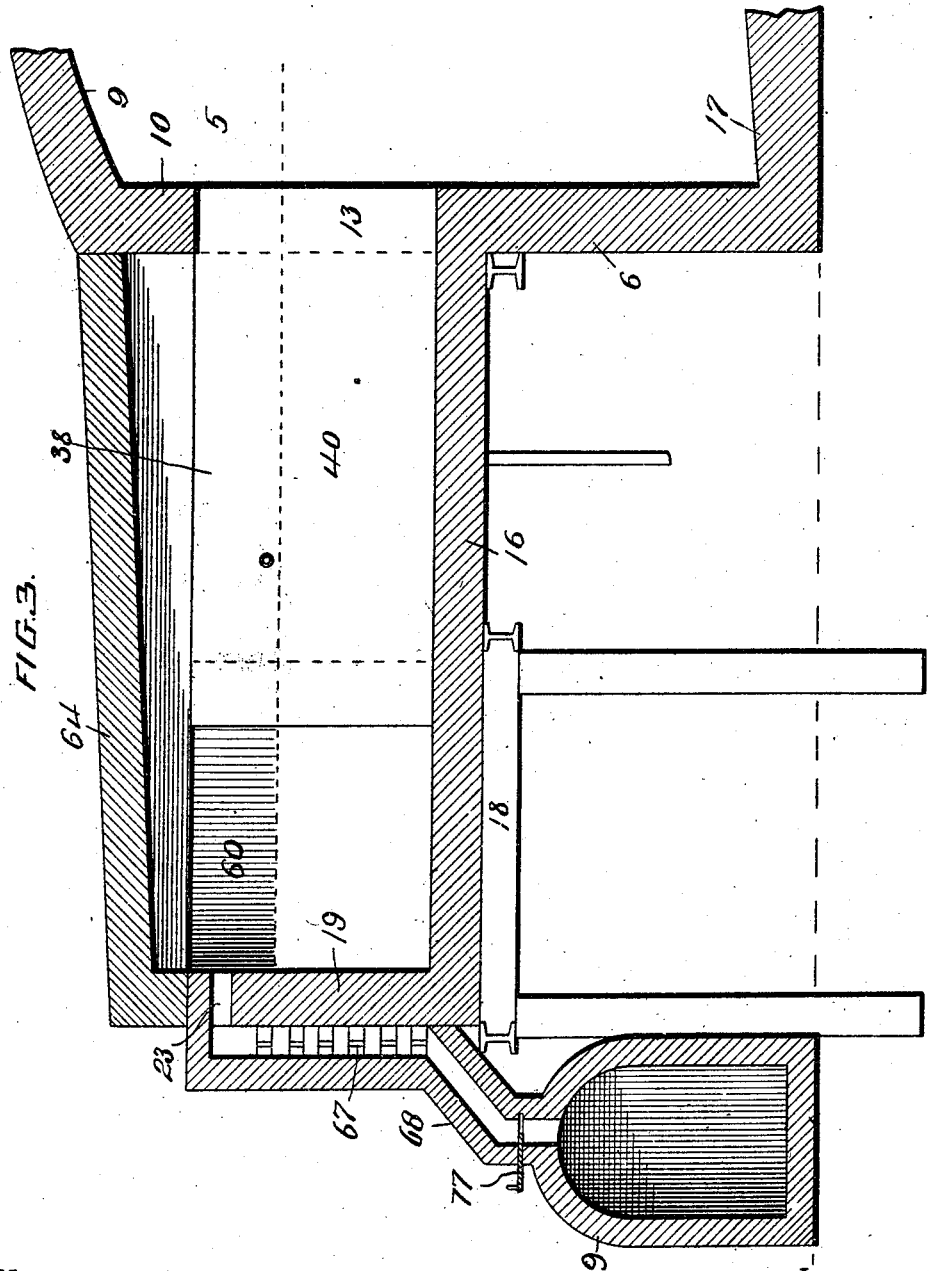

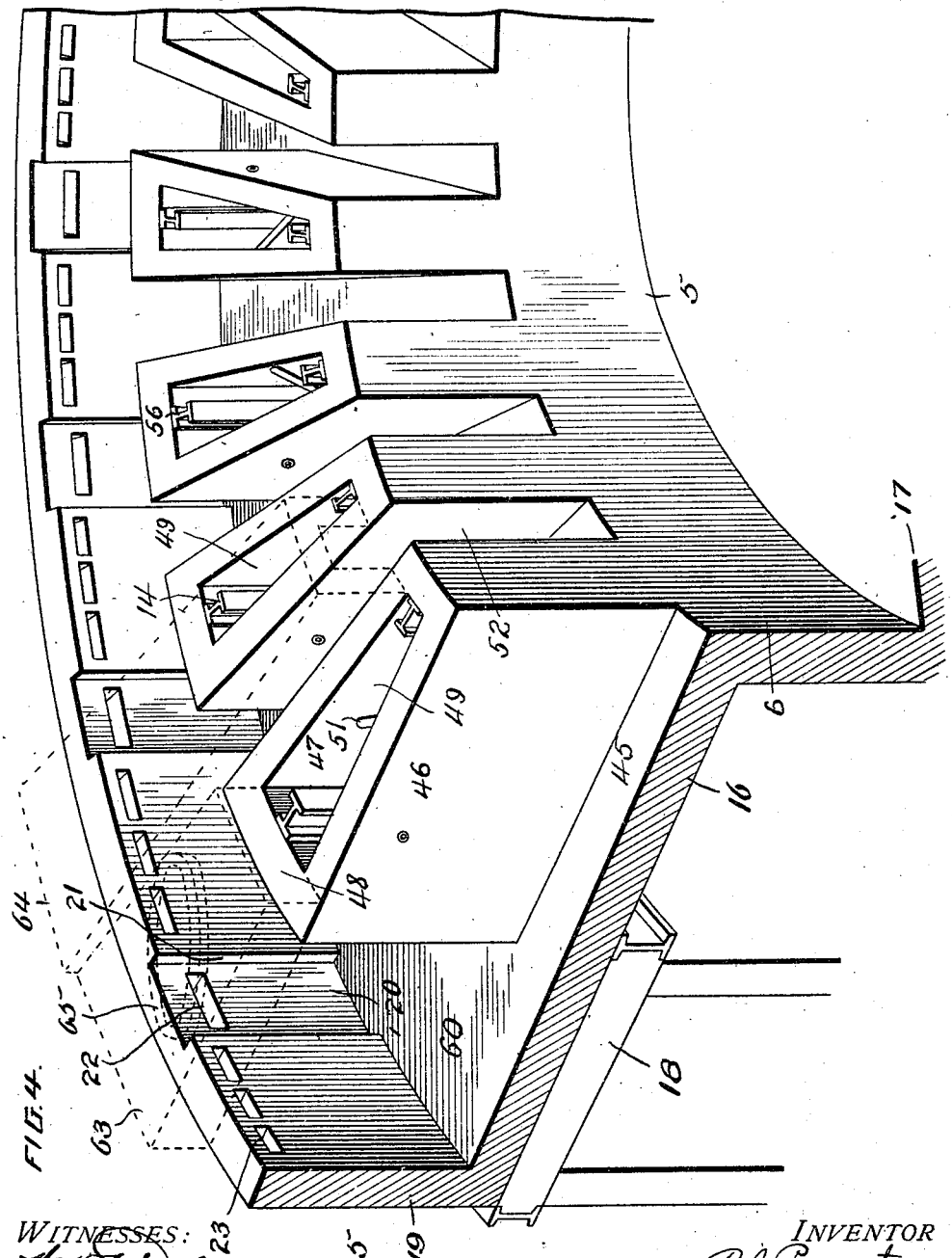

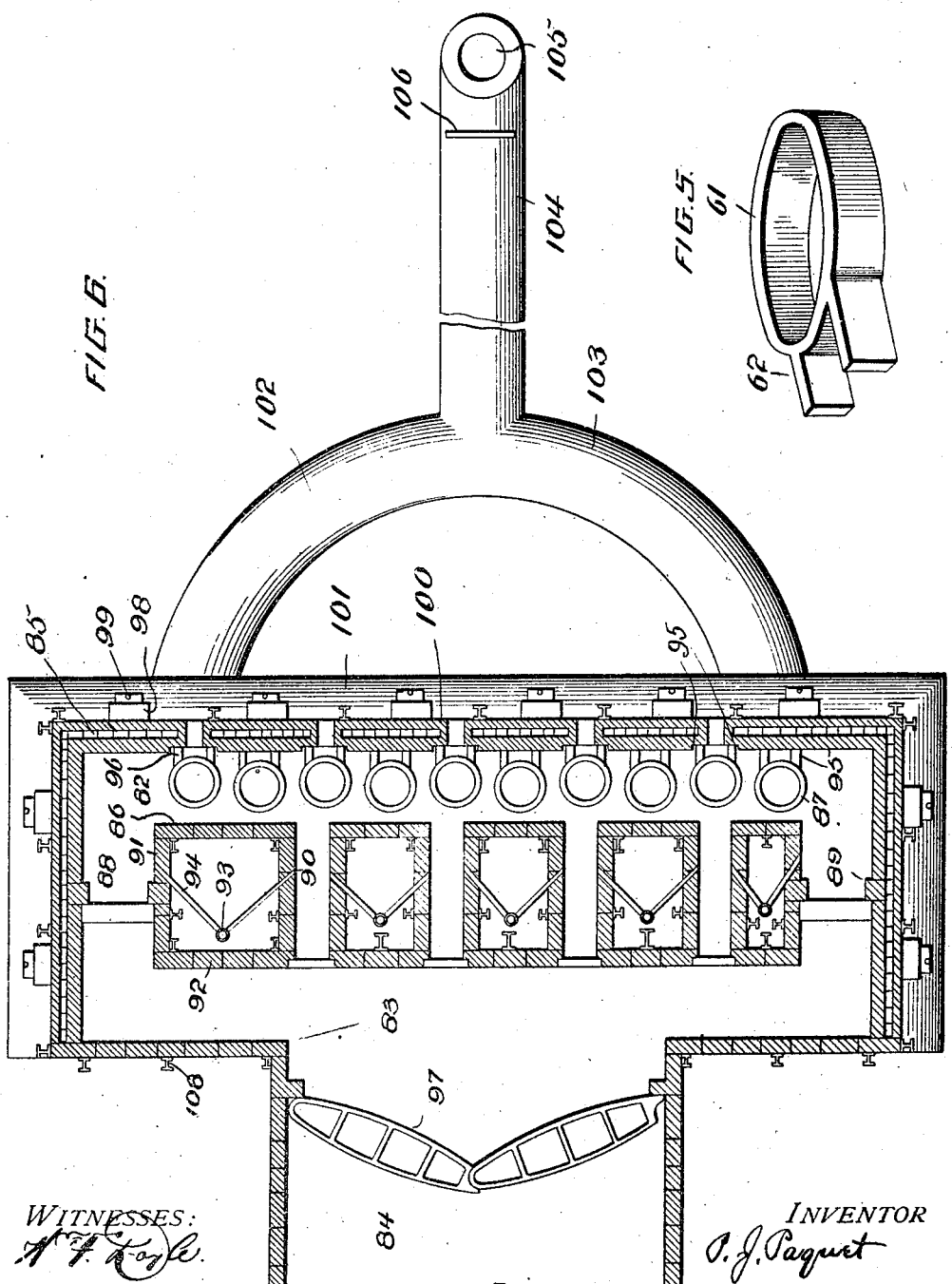

PIERRE JOSEPH PAQUET, OF JEANNETTE, PENNSYLVANIA.

GLASS-FURNACE.

1,000,546.  Specification of Letters Patent.  Patented Aug. 15, 1911.

Application filed June 14, 1910. Serial No. 566,740.

*To all whom it may concern:*

Be it known that I, PIERRE JOSEPH PAQUET, a citizen of the United States, residing at Jeannette, in the county of Westmoreland and State of Pennsylvania, have invented certain new and useful Improvements in Glass-Furnaces, of which the following is a specification.

This invention relates to glass tank furnaces of the regenerative type and the object thereof is to provide a furnace of such class in a manner as hereinafter set forth whereby the removal of the molten glass in batches can be had at a plurality of points and with each of the batches free from any foreign matter floating upon the surface of the molten body within the furnace.

A further object of the invention is to provide a furnace of the class referred to with means for temporarily arresting a plurality of gathering rings whereby the rings will be held stationary during the removal of the batches and to furthermore provide the furnace with means whereby the gathering rings can be shifted after being temporarily arrested so that the gathering rings can float upon the surface of the molten body within the furnace and to another point to convey a fresh batch of molten glass in position to be gathered. In this connection it will be stated that a plurality of gathering rings is employed for the reason that when a batch of glass is gathered from one of the rings, the string or thread left behind by the gatherer impairs the surface of the molten glass within the gathering ring and no more glass can be gathered from the ring until the threads, string or residue has had a chance to again melt and assume its proper consistency. Therefore, after the batch has been gathered from a ring, the ring is shifted from its temporary position and floats upon the surface of the molten body and while the ring is moving, the string, threads or residue has a chance to again melt and assume its proper consistency so that when the ring is again arrested, the glass within the ring will be of the proper consistency for a new batch.

A further object of the invention is to provide a furnace of the class referred to with means communicating therewith for removing the gases and fumes from that chamber of the furnace from which the molten glass is removed in batches whereby the gases and fumes will not interfere with the operator when removing a batch or batches of glass and to provide the furnace with means in a manner as hereinafter set forth and which communicates with the means for removing the gases and fumes for preventing the heating flames from passing to the stack.

A further object of the invention is to provide a furnace of the class referred to with means in a manner as hereinafter set forth for heating the molten glass as it travels from the melting chamber to the collecting chamber so that when the glass is gathered in batches, it will be of the proper consistency.

Further objects of the invention are to provide a glass furnace of the class referred to which shall be comparatively simple in its construction and arrangement, conveniently-operated, efficient in its use, strong, durable, allowing for the simultaneous removal of a plurality of batches of glass, and comparatively inexpensive to set up.

With the foregoing and other objects in view, the invention consists of the novel construction, combination and arrangement of parts as hereinafter more specifically described and illustrated in the accompanying drawings, wherein is shown the preferred embodiment of the invention but it is to be understood that changes, variations and modifications can be resorted to which come within the scope of the claims hereunto appended.

In the drawings: Figure 1 is a sectional plan of a glass melting furnace in accordance with this invention and with the melting chamber broken away. Fig. 2 is a section on line A—A, Fig. 1. Fig. 3 is a section on line B—B, Fig. 1. Fig. 4 is an enlarged elevation showing a portion of the collecting chamber and the means to provide the passages which communicate with said chamber, said view further illustrating a portion of the gathering chamber or tank. Fig. 5 is a perspective view of a gathering ring, and, Fig. 6 is a sectional plan of a modified construction.

Referring to Figs. 1 to 5 in detail, a glass furnace in accordance with this invention embodies a melting chamber, a gathering chamber or tank, a nose, and flues communicating with the nose for carrying off the gases and fumes. The melting chamber may be of any suitable contour and formed of any suitable material, but as shown, is of rectangular contour and provided with side walls 1, 2 and an end wall (not shown). The side walls 1, 2 are provided with gas burners 3 and the top (not shown) of the melting chamber is also provided with gas burners. The bottom 4 of the melting chamber inclines downwardly toward the gathering chamber which is indicated by the reference character 5 and as shown is provided with a semi-circular wall 6 and its bottom forms a continuation of the bottom 4 of the melting chamber and inclines in the same plane. Arranged at the inner end of the melting chamber 1 is a pair of skimming frames 7, 8, the function of which is to hold back any solid matter that is floating upon the molten glass on the passage of the glass from the melting chamber toward the gathering chamber. The top of the gathering chamber is indicated by the reference character 9 and is dome-shape in contour and is provided with a depending extension 10 which is seated upon the wall 6. The extension 10 is continuous. Portions of the wall 6 of the chamber 5 are removed to provide the enlarged outlets 11, 12 and the plurality of contracted outlets 13. These outlets communicate with the nose to allow the molten glass to pass from the gathering chamber 5 into the nose. The wall 6 of the gathering chamber 5 is reinforced by the vertically-disposed I-beams 14.

The nose which is shown somewhat enlarged in Fig. 4 and which is referred to generally by the reference character 15 consists of a bottom 16 arranged above the plane of the bottom 17 of the chamber 5 and which is mounted upon the support 18. The nose 15 is semi-circular in contour and further embodies a front wall 19 having its inner face provided at intervals with vertically-disposed contracted portions 20 to provide pairs of vertically-disposed shoulders 21. Each of the contracted portions 20 of the front wall 19 of the nose is formed with a rectangular slot 22 and each of the enlarged portions of the front wall 19 between each pair of contracted portions 20 is provided with a plurality of longitudinally-extending openings 23. The end walls of the nose are indicated by the reference characters 24, 25 and which are reinforced by the vertically-disposed I-beams 26. The front wall 19 is also reinforced by vertically-disposed I-beams 27. Arranged within the nose are two pairs of transversely-extending partitions, the partitions of one pair being indicated by the reference characters 28 and 29 and the partitions of the other pair by the reference characters 30 and 31. The partitions 29 and 31 extend at an inclination while the partitions 26 and 30 extend parallel with the end walls 24, 25. The partitions are built against the outer face of the wall 6 of the gathering chamber 5 and also upon the bottom 16 of the nose. Built against the other ends of the front wall 19 are the curved wall sections 32 which are spaced from the front wall 19 of the nose. The partition 28 is flush with one wall of the outlet 11 and the end wall 24 is flush with the other wall of the outlet 11 whereby an enlarged passage 32$^a$ is provided in communication with the outlet 11. The partition 30 is flush with one wall of the outlet 12 and the end wall 25 is flush with the other wall of the outlet 12 whereby an enlarged passage 33 is provided and which communicates with the outlet 12. The partition 29 is flush with one wall of the outlet 13 and the partition 31 is also flush with one wall of another of the outlets 13. The curved wall sections 32 are braced through the medium of vertically-disposed I-beams 34. The curved wall sections 32 in connection with the partitions and end wall of the gathering chamber provide spaces 35 in each of which is arranged a gas supply pipe 36 having a burner 37. The burners 37 project through the partitions 29 and 31. Arranged upon the bottom 16 of the nose and having one end abutting against the outer face of the wall 6 of the gathering chamber and to one side of the partition 29 is a series of pairs of partitions 38 which are radially-disposed and the partitions of each pair of partitions have the other ends thereof connected by a curved wall section 39. The pairs of partitions 38 are spaced from each other and are flush with the walls of certain of the outlets 13 and provide contracted passages 40. The curved wall sections 39 are braced by the vertically-disposed I-beams 41 and the curved wall sections 39 in connection with the partitions 38 provide spaces 42 in each of which extends a gas supply pipe 43 provided with burners 44 projecting through the wall sections 39. The walls 6 of the gathering chamber 5 centrally thereof is provided with an enlarged outlet 45 and abutting against the outer face of the wall 6 and arranged flush with each of the walls of the outlet 45 is a partition 46. Associating with each of the partitions 46 is a partition 47 which is flush with a wall of a contracted outlet 13. Each of the partitions 47 abuts at one end against the wall 6 and its outer end is connected to a partition 47 by a curved wall section 48. Each partition 47 with its associating partition 46 in connection with the curved wall section 48 provides a space 49 in which extends a gas supply pipe 50 provided with burners 51 which project through the partitions 46 and 47. The opposing partitions 46 form an enlarged passage 52 which communicates with the outlet 45. The curved wall sections 48 are reinforced by vertically-disposed I-beams 52. The curved wall sections 39 as well as the curved wall sections 48 are spaced from the front wall 19 of the nose. Arranged upon the bottom 16 of the nose and having one end abutting against the outer face of the wall 6 of the gathering chamber and to one side of the partition 31 is a series of pairs of partitions 53 which are radially-disposed and the partitions of each pair have the other ends thereof connected by a curved wall section 54. The pairs of partitions 53 are spaced from each other and are flush with the walls of certain of the outlets 13 and provide contracted passages 55. The wall sections 54 are braced by the vertically-disposed I-beams 56 and the curved wall sections 54 in connection with the partitions 53 provide spaces 57 in each of which extends a gas supply pipe 58 provided with burners 59 projecting through the partitions 53. The curved sections 54 are spaced from the front wall 19 of the nose. The curved wall sections 32, 39, 48 and 54 form in connection with the front wall 19 of the nose a collecting chamber for a series of gathering rings 61. Each of the rings 61 is provided with a pair of protuberances 62 adapted to engage the shoulders 21 whereby the rings are temporarily arrested. The top of the nose is formed from two series of plates, the plates of one series being indicated by the reference character 63 and the plates of the other series by the reference character 64. Each of the plates 63 is provided with an opening 65 and is mounted upon the front wall 19 of the nose and upon a curved wall section and each of the plates 64 is mounted upon the front wall of the nose and also upon a pair of opposing partitions and abuts against the extension 10 of the top wall of the gathering chamber 5. The length of each of the plates 63 is such that access can be had to operate the cut-offs 66 carried by the gas supply pipe within each of the spaces formed by the partitions and curved wall sections. The openings 65 in the plate 63 enable the operator to remove a batch of glass from within a gathering ring arranged within the collecting chamber 60.

Built against the front wall 19 of the nose and communicating with the collecting chamber 60 through the medium of the rectangular openings 23 is a checker work 67 which communicates by the conduit 68 with a semi-circular common receiving chamber or flue 69 having projecting therefrom the conducting flues 70, 71 and 72 which open into a common discharge flue 73, the latter communicating with the stack 74. Dampers 75 and 76 are provided for the flues 70 and 73 and dampers 77 are provided for the conduits 68. Mounted in and extending transversely of the checker work 67 are sleeves 78 which register with the rectangular slots 22 and the front wall 19 of the nose. The sleeves 78 are closed by the removable plugs 79. The openings 23 constitute exhaust outlets for the gases and fumes from the collecting chamber 60 and the rectangular slots 22 provide openings whereby access can be had to the interior of the collecting chamber 60 for the purpose of skimming foreign bodies from the surface of the molten glass and which also provide means whereby access can be had to the collecting chamber 20 so that the gathering rings 61 can be shifted from engagement with the shoulders 21 to enable the ring to float over the surface of the molten glass within the furnace.

The passages 32, 33 and 52 enable the gathering rings to pass from the gathering chamber 5 and into the collecting chamber 60 whereby they will eventually engage the shoulders 21 and have their movement temporarily arrested. These passages also allow the molten glass to flow into the collecting chamber 20. The passages 40 and 55 allow the molten glass to flow from the gathering chamber into the collecting chamber 60. The burners 37, 44, 50 and 59 enable the glass to be heated as it travels through the passages from the gathering chamber to the collecting chamber 60.

Each of the plates 63 is formed with a boss 80 for the reception of a removable lid or cover when occasion so requires. The height of the plates 64 is greater than the plates 63 and each of the plates 64 at its inner end is flush with the top 9 of the gathering chamber 5. Each of the plates 64 is substantially of inverted U-shape in cross-section. The bottom 16 of the nose is cut-away so as to communicate with the spaces formed by the partitions and to allow of the extending of the gas supply pipes into the spaces as clearly shown in Fig. 2. The height of the body of molten glass within the furnace is indicated by a dotted line 81. Fig. 2.

The gathering rings 61 are adapted to enter the collecting chamber 60 through the central passage 52, but in some instances, the rings will enter the collecting chamber through the passages 32 and 33. The downward current of the molten glass will have a tendency to shift the gathering rings in the collecting chamber 60 and some of the rings will pass to the right and others to the left. The arrows in Fig. 1 indicate the way the gathering rings travel. The gathering rings are adapted to convey fresh batches of molten glass in position to be gathered and the reason so many rings are employed is owing to the fact that when glass is gathered from one of the rings, the thread or string left behind by the gatherer impairs the surface of the molten glass within the gathering ring and no more glass can be gathered from the ring until the string or thread or residue has a chance to again melt and assume its proper consistency. Further if but one gathering ring is employed, it would soon be rendered useless by the strings or threads hardening upon the exposed surface of the ring. In some instances a boy is employed to immerse the rings and move them as they flow into the central part of the gathering chamber.

During the operation of the furnace gas is admitted to different points and upon it contacting with the molten glass, it is ignited, thereby heating the glass. The checker work is used for preventing the flame from passing through the flues to the stack.

The modification as shown in Fig. 6 differs only in the shape of the gathering chamber and nose from that shown in Fig. 1. In Fig. 6 the shape is rectangular whereas in Fig. 1 it is semi-circular. The flue 76 is dispensed with when the rectangular form of furnace is set up. In Fig. 6 the collecting chamber is indicated by the reference character 82, the gathering chamber by the reference character 83 and the melting chamber by the reference character 84. The wall sections which oppose the front wall 85 of the nose are indicated by the reference character 86 and the passages for the gathering rings 87 are at each end of the nose and indicated at 88, 89. The partitions for forming the passages 88 and 89 and also the contracted passages 90 are indicated at 91. The wall of the gathering chamber 83 is indicated at 92. Within the spaces formed by the partitions 91, wall sections 86 and wall 92 are arranged the gas supply pipes 93, each provided with burners 94 which extend through the partitions 91 and open into the passages 88, 89 and 90. The shoulders formed in the inner face of the front wall 85 of the nose are designated at 95 and are adapted to engage the protuberances 96 of the gathering rings 87 and temporarily arrest the movement of the gathering rings. The skimming frames at the inner end of the melting chamber are designated at 97, the sleeves which communicate with the skimming openings in the wall 85 are designated at 98, the removable plugs for the sleeves 98 at 99, and the checker work which communicates with the interior of the collecting chamber 82 by the reference character 100. The common collecting flue which communicates with the checker work is indicated at 101 and the flues which project from the flue 101 are indicated at 102 and 103 and communicate with a common discharge flue 104 which opens into the stack 105 and is provided with a damper 106. The passages 88, 89 and 90 communicate with the gathering chamber 83 through suitable outlets formed in the wall 92 of the gathering chamber 83 and the walls of the furnace as well as the partitions are reinforced by the vertically-disposed I-beams 108.

The gas supplied is utilized for melting the material as well as keeping the glass in a molten state and is fed in any suitable manner whether the furnace be of the form shown in Fig. 1 or that shown in Fig. 6.

With five men on each shift, the glass will be ready for the machine to start and make the glass rollers. The invention saves all pot expenses, machinery and wages of cellar men.

What I claim is:

1. A glass furnace comprising a melting chamber, a gathering chamber communicating with the melting chamber, and a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings.

2. A glass furnace comprising a melting chamber, a gathering chamber communicating with the melting chamber, and a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings, and said nose further having openings in its top to allow of the removal of the gathered batches of glass from the gathering rings when arrested in the collecting chamber.

3. A glass furnace comprising a melting chamber, a gathering chamber communicating with the melting chamber, a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings, and gas burners carried by the partitions and communicating with the gas supply for heating the glass as it travels through said passages.

4. A glass furnace comprising a melting chamber, a gathering chamber communicating with the melting chamber, a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings, said nose further having openings in its top to allow of the removal of the gathered batches of glass from the gathering rings when arrested in the collecting chamber, and gas burners carried by the partitions and communicating with the gas supply for heating the glass as it travels through said passages.

5. A glass furnace comprising a melting chamber, a gathering chamber communicating with the melting chamber, a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings, and said nose further having its front wall provided with skimming openings, said skimming openings allowing of the entrance of a means to the collecting chamber for shifting the gathering rings.

6. A glass furnace comprising a melting chamber, a gathering chamber communicating with the melting chamber, and a nose embodying a collecting chamber and a plurality of partitions to form passages for establishing communication between the collecting chamber and gathering chamber for the travel of the molten glass and gathering rings from the gathering chamber to the collecting chamber, said nose further provided with means for temporarily arresting the travel of the gathering rings to enable the operator to remove a batch of glass from each of the rings, said nose further having openings in its top to allow of the removal of the gathered batches of glass from the gathering rings when arrested in the collecting chamber, and said nose further having its front wall provided with skimming openings, said skimming openings allowing of the entrance of a means to the collecting chamber for shifting the gathering rings.

In testimony whereof I affix my signature in presence of two witnesses.

PIERRE JOSEPH PAQUET.

Witnesses:
   E. C. CURRY,
   C. C. WALTHOUR.

---

Copies of this patent may be obtained for five cents each, by addressing the "Commissioner of Patents, Washington, D. C."